(12) United States Patent
Lee et al.

(10) Patent No.: US 11,685,170 B2
(45) Date of Patent: Jun. 27, 2023

(54) DEVICE AND METHOD FOR PRINTING AND INSPECTING TABLET

(71) Applicant: ENCLONY INC, Seoul (KR)

(72) Inventors: Kyung Ho Lee, Goyang-si (KR); Byung In Kim, Seoul (KR)

(73) Assignee: Enclony Inc, Seoul (KR)

(*) Notice: Subject to any disclaimer, the term of this patent is extended or adjusted under 35 U.S.C. 154(b) by 0 days.

(21) Appl. No.: 17/087,864

(22) Filed: Nov. 3, 2020

(65) Prior Publication Data
US 2021/0387465 A1    Dec. 16, 2021

(30) Foreign Application Priority Data

Jun. 12, 2020   (KR) .................. 10-2020-0071223

(51) Int. Cl.
*B41J 29/393*    (2006.01)
*B41J 2/44*    (2006.01)
(Continued)

(52) U.S. Cl.
CPC ............. *B41J 3/4073* (2013.01); *B41J 2/442* (2013.01); *B41J 3/28* (2013.01); *B41J 3/546* (2013.01); *B41J 3/60* (2013.01); *B41J 29/393* (2013.01)

(58) Field of Classification Search
CPC ... B41J 29/393; B41J 2/442; B41J 2/01; B41J 3/28; B41J 3/4073; B41J 3/546; B41J 3/60
See application file for complete search history.

(56) References Cited

U.S. PATENT DOCUMENTS

2004/0094050 A1   5/2004 Ackley
2009/0121472 A1* 5/2009 Battis ................. B41M 5/26
283/85
(Continued)

FOREIGN PATENT DOCUMENTS

EP    3501479 A1   8/2017
EP    4070906 A1   10/2022
(Continued)

OTHER PUBLICATIONS

Korean Office Action issued for corresponding KR Application No. 10-2020-0071223, dated Mar. 11, 2021.
(Continued)

*Primary Examiner* — Christopher E Mahoney
*Assistant Examiner* — Kendrick X Liu
(74) *Attorney, Agent, or Firm* — Renner, Otto, Boisselle & Sklar, LLP

(57) ABSTRACT

The present disclosure relates to a device for simultaneously performing printing of tablets and inspection on exteriors of the tablets, and provides a device for printing a tablet and inspecting an exterior of the tablet, comprising a transfer unit arranging and transferring tablets supplied from a tablet supplier in a line; a pre-printing image-capturing unit located on a transfer path on which the tablets are transferred to discriminate positions and orientations of the tablets, and disposed to capture images of exteriors of the tablets being transferred; a tablet printing unit located next to the pre-printing image-capturing unit on the transfer path on which the tablets are transferred, and printing the tablets being transferred, in consideration of discriminated results acquired from the images captured by the pre-printing image-capturing unit; and a post-printing image-capturing unit located next to the tablet printing unit on the transfer path on which the tablets are transferred, and capturing
(Continued)

images of exteriors of the printed tablets being transferred, to inspect the images or printed results of the printed tablets. According to an embodiment of the present disclosure, a plurality of functions may be performed with a single device, to maximize work efficiency in time and space, and reduce costs.

23 Claims, 9 Drawing Sheets

(51) Int. Cl.
    *B41J 3/28*     (2006.01)
    *B41J 3/407*     (2006.01)
    *B41J 3/54*     (2006.01)
    *B41J 3/60*     (2006.01)

(56) References Cited

U.S. PATENT DOCUMENTS

| | | | |
|---|---|---|---|
| 2011/0128557 A1* | 6/2011 | Kinoshita | B41J 11/007 358/1.5 |
| 2012/0132722 A1 | 5/2012 | Ackley | |
| 2014/0168309 A1* | 6/2014 | Morita | B41J 3/407 347/16 |
| 2015/0174916 A1* | 6/2015 | Hara | A61J 3/007 347/110 |
| 2016/0180515 A1 | 6/2016 | Seo | |
| 2017/0219497 A1 | 8/2017 | Shin | |
| 2017/0254762 A1 | 9/2017 | Yoo | |
| 2018/0104966 A1* | 4/2018 | Aoyagi | B41J 11/0095 |
| 2018/0148273 A1 | 5/2018 | Lee et al. | |
| 2018/0326747 A1* | 11/2018 | Tan | B41J 3/4073 |

FOREIGN PATENT DOCUMENTS

| | | | |
|---|---|---|---|
| IN | 201841036748 A | * | 10/2018 |
| JP | S6478643 A | | 3/1989 |
| JP | 2013-13711 A | | 1/2013 |
| JP | 2014-534903 A | | 12/2014 |
| JP | 2016-55057 A | | 4/2016 |
| JP | 2017-064213 | | 4/2017 |
| JP | 2017144241 A | | 8/2017 |
| JP | 2018-208 A | | 1/2018 |
| JP | 2018-513766 A | | 5/2018 |
| JP | 2018-117949 A | | 8/2018 |
| JP | 2020-081219 A | | 6/2020 |
| KR | 20-0361364 Y1 | | 9/2004 |
| KR | 20160045452 A | | 4/2016 |
| KR | 10-1669596 B1 | | 10/2016 |
| KR | 20180097717 A | * 8/2018 | ............. A61J 3/007 |
| KR | 10-2019-0054750 | | 5/2019 |
| KR | 20190083729 A | | 7/2019 |
| KR | 10-2019-0044089 | | 10/2019 |
| WO | 2013/040599 A2 | | 3/2013 |
| WO | 2015/008505 | | 1/2015 |
| WO | 2016/098692 | | 9/2017 |

OTHER PUBLICATIONS

Japanese Office Action issued for corresponding JP Application No. 2020-182916, dated Sep. 14, 2021.

* cited by examiner

DEVICE AND METHOD FOR PRINTING AND INSPECTING TABLET

CROSS-REFERENCE TO RELATED APPLICATION(S)

This application claims benefit of priority to Korean Patent Application No. 10-2020-0071223 filed on Jun. 12, 2020 in the Korean Intellectual Property Office, the disclosure of which is incorporated herein by reference in its entirety.

BACKGROUND

1. Field

The present disclosure relates to a device and method for printing and inspecting a tablet, in particular, a device for simultaneously printing a tablet and inspecting an exterior of the tablet, and a method for printing a tablet and inspecting an exterior of the tablet, using the device.

2. Description of Related Art

Regarding a tablet, it is necessary to print information such as a name or ingredients of the tablet, and the like, on one surface of the tablet, in order to increase identification of the tablet to prevent errors in preparing or administrating the tablet and to deliver correct information thereon.

In addition, in a process of producing a relatively large amount of tablets in an automated process, since external defects such as adhesion or contamination of foreign substances, cracks or partial damage due to contact or collision between tablets, deformation, or poor printing may occur, a process of classifying and discharging the tablets is required.

In the prior art, printing of tablets and inspection of exteriors of the tablets were performed with separate devices, such that a device for printing tablets and a device for inspecting exterior defects of the tablets had to be separately provided. As a result, since devices having considerable volume were occupied, there were restrictions in place and space, and costs were greatly increased, and it took a considerable amount of time to inspect the tablets, after printing the tablets.

In addition, in the prior art, since only a sensor for sensing tablets was installed, before printing the tablets, and a printing unit sensed only approximate positions of the tablets, it was impossible to accurately print the tablets in a certain position. Even if the inspection was performed after printing the tablets, it was impossible to perform an inspection on entire exteriors of the tablets. Therefore, there was a need to manually and inconveniently operate the tablets by a user.

Therefore, in order to finally manufacture a tablet as a good product, there is a need for a device for printing of the tablets and inspecting the entire exteriors of the tablets, including discriminating whether or not the printed tablets are acceptable, performing the printing processes and the inspection processes collectively to overcome restrictions in time and space and improve work efficiency, and performing an inspection of the entire exteriors of the tablets for increasing printing accuracy to improve accuracy, as well as reducing costs.

SUMMARY

An aspect of the present disclosure is to collectively perform printing of tablets and inspection of exteriors of the tablets to overcome restrictions in time and space and improve work efficiency, and perform a plurality of functions with a single device, to reduce costs.

According to an embodiment of the present disclosure, a device for printing a tablet and inspecting an exterior of the tablet, comprising a transfer unit transferring and arranging tablets supplied from a tablet supplier in a line; a pre-printing image-capturing unit located on a transfer path on which the tablets are transferred to discriminate positions and orientations of the tablets, and disposed to capture images of exteriors of the tablets being transferred; a tablet printing unit located next to the pre-printing image-capturing unit on the transfer path on which the tablets are transferred, and printing the tablets being transferred, in consideration of discriminated results acquired from the images captured by the pre-printing image-capturing unit; and a post-printing image-capturing unit located next to the tablet printing unit on the transfer path on which the tablets are transferred, and capturing images of exteriors of the printed tablets being transferred, to inspect the images or printed results of the printed tablets.

In addition, according to an embodiment of the present disclosure, the pre-printing image-capturing unit may further include a tablet surface inspector capturing images of surface conditions of the tablets, before printing, to determine whether surfaces of the tablets are defective.

In addition, according to an embodiment of the present disclosure, the transfer unit may include a first transfer unit transferring the tablets supplied from the tablet supplier, and a second transfer unit reversing orientations of the tablets received from the first transfer unit and transferring the reversed tablets. For example, the pre-printing image-capturing unit, the tablet printing unit, and the post-printing image-capturing unit, including a plurality of transfer units, may be variously arranged in each of the transfer units, and surfaces of each of the tablets may be variously printed and inspected according to various arrangements of the configuration. Therefore, a plurality of printing and inspection processes may be performed with a single device.

According to another aspect of the present disclosure, a method for printing a tablet and inspecting an exterior of the tablet is provided. According to another aspect of the present disclosure, the method includes a transfer operation of disposing and transferring tablets supplied from a tablet supplier by a transfer unit; a pre-printing image-capturing operation of capturing images of exteriors of the tablets being transferred by a pre-printing image-capturing unit, to discriminate positions and orientations of the tablets; a printing operation of printing the tablets being transferred by a tablet printing unit, in consideration of discriminated results acquired from the images captured by the pre-printing image-capturing unit; and an inspection operation of capturing images of exteriors of the printed tablets being transferred by a post-printing image-capturing unit, to inspect the images or printed results of the printed tablets.

In addition, the pre-printing image-capturing operation may further include capturing images of surface conditions of the tablets, before printing, to determine whether surfaces of the tablets are defective.

In the above method, the transfer operation, the pre-printing image-capturing operation, the printing operation, and the inspection operation may be performed in a plurality of transfer units, and various printing and inspection processes may be performed through a combination of each operation.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
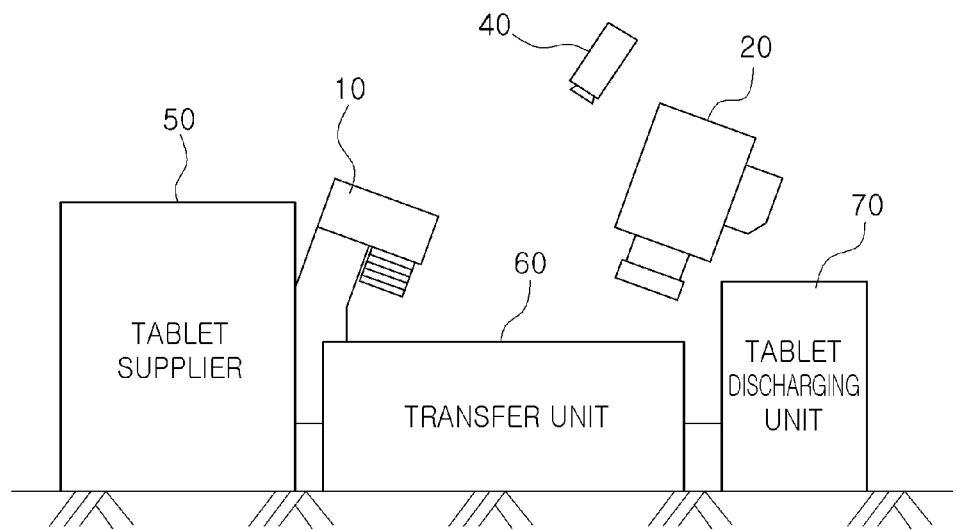
FIG. 1 is a block diagram of a device for printing a tablet and inspecting an exterior of the tablet, according to an embodiment of the present disclosure.

Hereinafter, the present disclosure will be described in example drawings in detail. In additions of reference numerals to elements in each of the drawings, it should be noted that the same elements are assigned the same numerals as possible, even when the same elements are indicated in different drawings.

Hereinafter, tablets used in a device according to an embodiment of the present disclosure may be, for example, pills, capsules, or the like.

The present disclosure may include a tablet supplier 50, a pre-printing image-capturing unit 10, a tablet printing unit 40, a post-printing image-capturing unit 20, and a tablet discharging unit 70, and a device for performing the above process may simultaneously perform printing of tablets and inspection on exteriors of the tablets.

According to an embodiment of the present disclosure, the tablet supplier 50 may include a rotation plate installed to be rotated on a base frame such that tablets supplied by the base frame and a hopper are arranged in a line on an outside of the rotation plate by centrifugal force, and disposed to be inclined at an angle, and a guide portion aligned with an inclined surface of the rotation plate, to be discharged to a transfer unit 60 by centrifugal force and sliding force due to the inclined surface.

Alternatively, according to another embodiment of the present disclosure, a supply passage discharging and falling tablets supplied by the hopper one by one, collecting the falling tablets, arranging the collected tablets to be spaced apart from each other, and having a passage for discharging the spaced tablets to be transferred to the transfer unit 60, may be included. For example, the tablet supplier 50 is not limited to the above embodiment, and other embodiments may be applied, unless contradictory.

The pre-printing image-capturing unit 10 may confirm positions and orientations of tablets supplied by the tablet supplier 50 and arranged on the transfer unit 60, for example, a distance ranging from a point in which a previous tablet is printed by the tablet printing unit 40 to a point in which a current tablet is present, whether or not one surface of a tablet is rotated, and the like, by capturing and image processing, and may control the tablet printing unit 40 based on information obtained through the pre-printing image-capturing unit 10, to precisely control such that printing is not biased toward one side of the tablet, when the printing is performed by the tablet printing unit 40.

The above processes are to prevent printing on one surface of the tablet from exceeding a central portion of the tablet by a certain range, and accuracy and success rate of printing the tablet may be improved by the pre-printing image-capturing unit 10.

In addition, according to an embodiment of the present disclosure, the pre-printing image-capturing unit 10 may further include a tablet surface inspector (not illustrated) for capturing a surface condition of the tablet, before printing, to determine whether a surface of the tablet is defective. Before printing, the surface condition of the tablet may be inspected to confirm whether printing cannot be performed due to the presence of foreign substances, or the like, and precise printing thereof may be performed with inspection of the surface condition of the tablet and discriminated results of position and orientation of the tablet.

As described above, since the pre-printing image-capturing unit 10 may further include the tablet surface inspector, a captured image for the surface condition of the tablet, separately from a captured image for printing and orientation discrimination of the tablet. According to an embodiment, capturing images of the surface condition of the tablet, before printing, may be performed at the same time, as the pre-printing image-capturing unit 10 captures the images to discriminate the printing and orientation of the tablet, to acquire a surface condition of the tablet, before printing, and printing and orientation discrimination results of the tablet together.

After the tablet printing unit 40 prints an image captured by the pre-printing image-capturing unit 10, the post-printing image-capturing unit 20 may capture an image of an exterior of the tablet, and may analyze the captured image to perform a plurality of tablet exterior inspections. The post-printing image-capturing unit 20 may perform inspections on printed results and an exterior of the printed surface of the tablet, or may perform an entire exterior inspection on the printed surface of the tablet and the opposite surface thereof. In order to inspect the exterior of the tablet, an image of the exterior of the tablet may be captured using a plurality of cameras, the image may be analyzed to inspect not only printing accuracy of the tablet, but also an entire exterior and shape of the tablet, such as the presence of cracks in the tablet, the presence of foreign substances attached to the external surface of the tablet, or the like, to determine whether the printed tablet is a good product or a defective product, and to classify the tablet accordingly.

The tablet discharging unit 70 may classify and discharge the tablet as a good product or a defective product, according to the captured results of the post-printing image-capturing unit 20.

FIGS. 1 to 5 are block diagrams illustrating an embodiment of a device for printing a tablet and inspecting an exterior of the tablet, according to an embodiment of the present disclosure.

In a device for printing a tablet and inspecting an exterior of the tablet, a tablet supplier, a transfer unit, and a tablet discharging unit may be provided in various embodiments, unless contradictory to the present disclosure, and are not limited to embodiments of the present disclosure.

As illustrated in FIG. 1, according to an embodiment of the present disclosure, a tablet supplier 50, a pre-printing image-capturing unit 10, a tablet printing unit 40, a post-printing image-capturing unit 20, and a tablet discharging unit 70 may be included. In this case, the above configuration may be arranged in order along a transfer path of a transfer unit 60, Alternatively, the transfer unit 60 may include a first transfer unit 61 and a second transfer unit 62, wherein the first transfer unit 61 may transfer a tablet supplied from the tablet supplier 50, and the second transfer unit 62 may reverse an orientation of the tablet delivered from the first transfer unit 61, and may transfer the reversed tablet.

Figure 2:
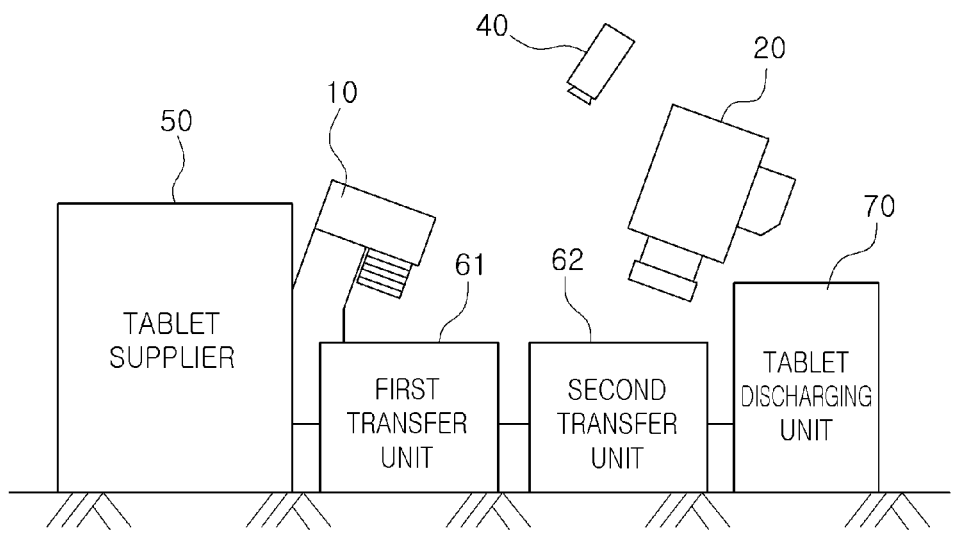
FIG. 2 is a block diagram of a device for printing a tablet and inspecting an exterior of the tablet, according to another embodiment of the present disclosure.

As illustrated in FIG. 2, a tablet supplier 50, a pre-printing image-capturing unit 10, a tablet printing unit 40, a post-printing image-capturing unit 20, and a tablet discharging unit 70 may be arranged along a transfer path of a first transfer unit 61 and a transfer path of a second transfer unit 62.

Figure 3:
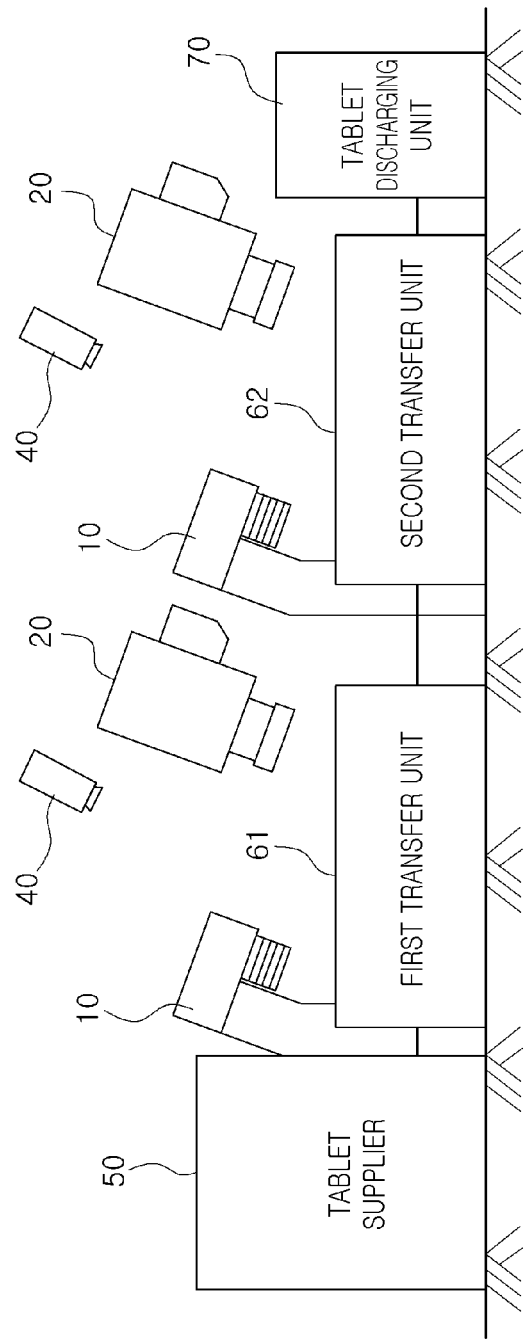
FIG. 3 is a block diagram of a device for printing a tablet and inspecting an exterior of the tablet, according to another embodiment of the present disclosure.

As illustrated in FIG. 3, a first pre-printing image-capturing unit 10, a first tablet printing unit 40, and a first post-printing image-capturing unit 20 may be arranged on a transfer path of a first transfer unit 61, to perform printing on a first surface of a tablet and inspection of an entire exterior of the first surface of the tablet. In addition, a second pre-printing image-capturing unit 10, a second tablet printing unit 40, and a second post-printing image-capturing unit 20 may be installed on a transfer path of a second transfer unit 62, to perform printing on a second surface of the tablet and inspection of an entire exterior of the second surface of the tablet.

Since the tablet has a three-dimensional shape, it may be difficult to perform inspection of an entire exterior at a fixed position. Printing of the tablet and inspection of an exterior of the tablet may be performed by variously adjusting arrangement of different elements along a single transfer unit 60. Alternatively, printing of the tablet and inspection of an exterior of the tablet may be simultaneously performed by arranging a plurality of elements along a plurality of transfer units 61 and 62.

In addition, according to an embodiment of the present disclosure, a pre-printing image-capturing unit 10, which may be located on a transfer path of a transfer unit 60 and may capture an image of an exterior of a tablet being transferred to discriminate a position and an orientation of the tablet, a tablet printing unit 40, which may be located next to the pre-printing image-capturing unit 10 on the transfer path on which the tablet is transferred, and printing the tablet being transferred, in consideration of discriminated results acquired from the image captured by the pre-printing image-capturing unit 10, and a post-printing image-capturing unit 20 located next to the tablet printing unit on the transfer path on which the tablet is transferred, and capturing an image of an exterior of the printed tablet being transferred, to inspect the image or printed results of the printed tablet, may be included.

In particular, a pre-printing image-capturing unit 10, a tablet printing unit 40, and a post-printing image-capturing unit 20 may correct a position of a tablet and inspect an exterior of the tablet by capturing an image of an entire exterior of the tablet, and may be thus elements that require capturing an image of the tablet in various directions.

Figure 4:
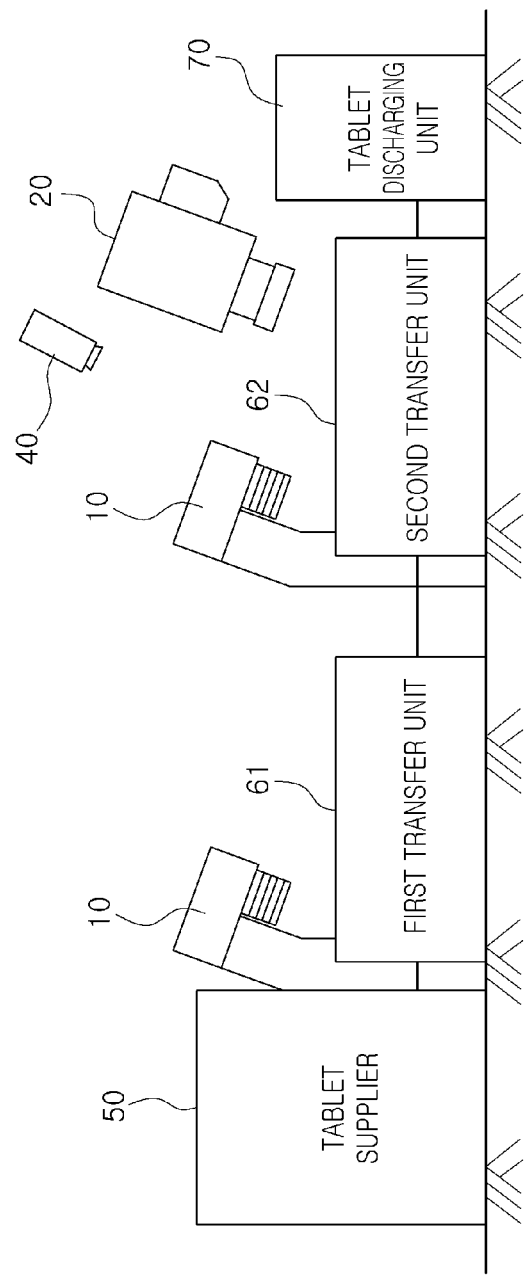
FIG. 4 is a block diagram of a device for printing a tablet and inspecting an exterior of the tablet, according to another embodiment of the present disclosure.

Therefore, as illustrated in FIG. 4, a transfer unit 60 may include a first transfer unit 61 and a second transfer unit 62. In addition, when a tablet supplied from a tablet supplier 50 moves on a transfer path of the first transfer unit 61, a first pre-printing image-capturing unit 10 disposed along the transfer path of the first transfer unit 61 may previously capture an image of a first surface of the tablet to inspect presence or absence of foreign substances and a position of the tablet.

In addition, a second pre-printing image-capturing unit 10 disposed on a transfer path of the second transfer unit 62 may reverse a position of a tablet and may previously capture an image of a second surface of the tablet along the transfer path of the second transfer unit 62, to inspect presence or absence of foreign substances and a position of the tablet.

For example, the first pre-printing image-capturing unit 10 may sense a tablet along the first transfer unit 61, the second pre-printing image-capturing unit 10 may sense a tablet along the second transfer unit 62, and a tablet printing unit 40 and a post-printing image-capturing unit 20 may be then installed.

In this case, according to an embodiment of the present disclosure, the tablet printing unit 40 may be disposed on the first transfer unit 61, the second transfer unit 62, or both of the first transfer unit 61 and the second transfer unit 62.

Figure 5A:
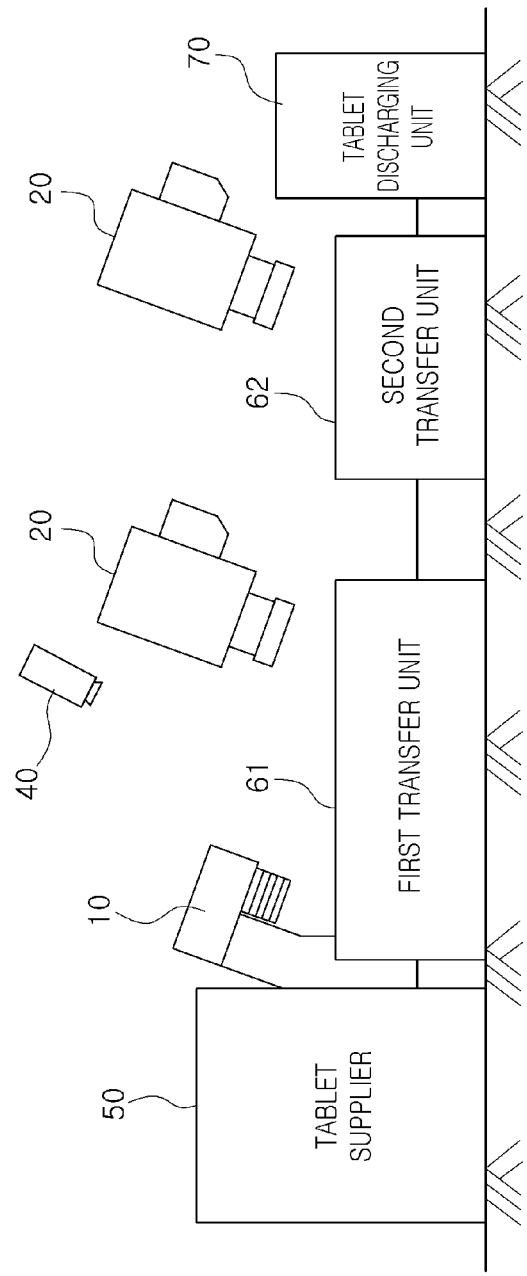
FIGS. 5A and 5B are block diagrams of devices for printing a tablet and inspecting an exterior of the tablet, according to another embodiment of the present disclosure.
Figure 5B:
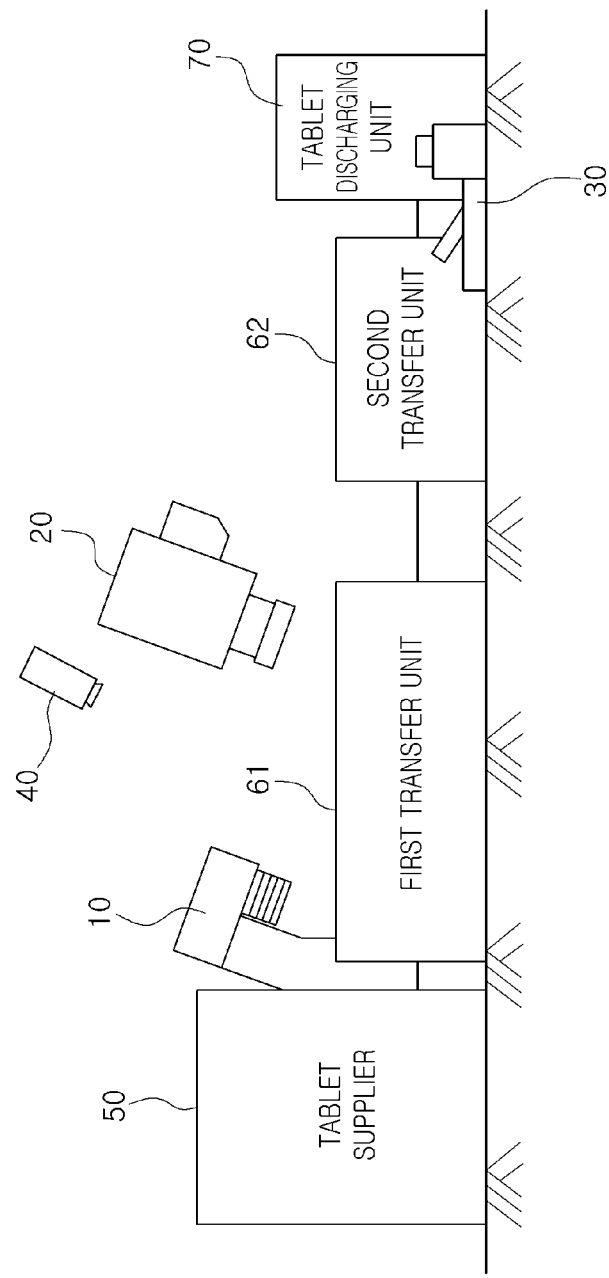

As illustrated in FIGS. 5A and 5B, a transfer unit 60 may include a first transfer unit 61 and a second transfer unit 62. In addition, when a tablet moves on a transfer path of the first transfer unit 61, a first post-printing image-capturing unit 20 disposed along the transfer path of the first transfer unit 61 may capture an image of a first surface of the tablet, to inspect printed results and an entire exterior of the tablet.

In addition, a second post-printing image-capturing unit 20 installed on a transfer path of the second transfer unit 62 may reverse a position of a tablet to capture an image of a second surface of the tablet, after printing, along the transfer path of the second transfer unit 62, to inspect an entire exterior of the tablet.

For example, the first pre-printing image-capturing unit 10 may sense a tablet along the first transfer unit 61. As above, with regard to printing of the tablet by the tablet printing unit 40, the second post-printing image-capturing unit 20 may inspect printed results and an entire exterior of the first surface of the tablet, and post-printing image-capturing units 20 and 30 may inspect an entire exterior of the second surface of the tablet, along the second transfer unit 62 reversing an orientation of the tablet and transferring the reversed tablet.

In this case, as illustrated in FIG. 5A, a second post-printing image-capturing unit 20 installed along the second transfer unit 62 may be installed above the second transfer unit 62 along the transfer path of the second transfer unit 62. Alternatively, as illustrated in FIG. 5B, a second post-printing image-capturing unit 30 may be installed below the second transfer unit 62 along the transfer path of the second transfer unit 62.

In addition, according to embodiments of the present disclosure, as illustrated in FIGS. 1 to 5, a tablet printing unit may be installed along at least one transfer path among a first transfer unit 61 and a second transfer unit 62.

Specifically, a tablet printing unit 40 may be installed on the first transfer unit 61, or a tablet printing unit 40 may be installed on the second transfer unit 62.

Alternatively, a tablet printing unit 40 may include, at least, a first tablet printing unit and a second tablet printing unit. The first tablet printing unit and the second tablet printing unit may be installed in the first transfer unit 61 and the second transfer unit 62, respectively. Therefore, the tablet printing unit 40 may be installed on a transfer path of a transfer unit 60, and may be installed as one or a plurality of tablet printing units.

For example, when printing both surfaces of a tablet, a first pre-printing image-capturing unit and a first tablet printing unit may be arranged on a transfer path of the first transfer unit 61, and a second pre-printing image-capturing unit and a second tablet printing unit may be arranged, on a transfer path of the second transfer unit 62 reversing a position of the tablet and transferring the reversed tablet.

A pre-printing image-capturing unit 10, a tablet printing unit 40, a post-printing image-capturing unit 20, and a tablet discharging unit 70 may be arranged along the transfer unit 60, and printing of a tablet and inspection of an exterior of the tablet may be performed by the transfer unit 60. The transfer unit 60 will be described below.

According to an embodiment of the present disclosure, the transfer unit 60 may be a rotation tray, and may include a first rotation tray and a second rotation tray as the first transfer unit 61 and the second transfer unit 62, respectively, to inspect both surfaces of a tablet.

The transfer unit 60 according to an embodiment of the present disclosure may be installed to pass through a rotation shaft, may form a negative pressure space in which a negative pressure is, at least, partially applied therein, may be coupled to and rotate the rotation shaft and a fixed plate in which a suction hole, at least, communicating with the negative pressure space is provided, and may include a rotation tray in which a concave groove capable of communicating with the negative pressure space is formed to have a circumferential shape.

A rotation plate may be coupled to the rotation shaft by a coupling screw, and the rotation shaft may be connected to a driving unit, such as a motor or the like, to rotate. The rotation plate may be formed to cover one surface of the fixed plate, an external circumferential end portion thereof may be bent toward the fixed plate to form an extension portion, and the extension portion may shield an end surface of the fixed plate.

A concave groove may be formed in the extension portion, and may be disposed along a circumference of the rotation plate. A plurality of communication holes capable of communicating with a suction hole or a discharge hole and rotating on a side wall of the concave groove may be formed at predetermined intervals.

In this way, the rotation tray may rotate on and may cover one surface of the fixed plate, a negative pressure may be applied at a position in which the rotation tray communicates with the suction hole of the fixed plate, and a positive pressure may be applied at a position in which the rotation tray communicates with a discharge hole of the fixed plate, through the communication holes of the concave groove formed to have a circumferential shape along the extension portion of the rotation tray.

Therefore, in a section in which a negative pressure is applied, tablets may be supported in a state adsorbed to a seating member on the concave groove provided along the circumference of the rotation plate, and may be sequentially rotated together with the rotation plate and transferred. Positions of the tablets adsorbed on the seating member does not necessarily correspond to positions of the communication holes, and may be aligned in a line in a circumferential concave groove at non-uniform intervals.

For example, since positions at which the tablets are moved may not be fixed at regular intervals and may be present at non-uniform intervals, positions of the tablets to be printed by the tablet printing unit 40 may be changed. In order to perform precise printing by aligning a center of each of the tablets, control of positioning a camera for the tablets should be included.

Therefore, the transfer unit 60 of the present disclosure may be used to adsorb and transfer tablets sequentially and serially supplied by the tablet supplier 50 in a circumferential direction in sequence and regardless of supply intervals and sense exteriors of the tablets by the pre-printing image-capturing unit 10, and print then the tablets by the tablet printing unit 40 and inspect the exteriors of the tablets by the post-printing image-capturing units 20 and 30.

Alternatively, the transfer unit 60 is not limited to the rotation tray having an inclination, as described above, and other embodiments may be applied thereto, unless contradictory.

As another embodiment according to an embodiment of the present disclosure, the transfer unit 60 may be a vertical rotating disk or a vertical rotating drum, and may have a concave groove in which tablets are disposed along a circumferential surface of the disk or drum rotating in a clockwise direction. The tablets may be adsorbed and detached according to a negative pressure or a positive pressure in the concave groove, and a pre-printing image-capturing unit 10, a tablet printing unit 40, post-printing image-capturing units 20 and 30, and a tablet discharging unit 70 may be arranged externally along the circumferential surface of the vertical rotating disk or drum, to print and inspect the tablets.

A pre-printing image-capturing unit 10, a tablet printing unit 40, and post-printing image-capturing units 20 and 30 may be arranged along the circumferential surface of the vertical rotating disk or drum. In this case, the transfer unit should not be transfer units of two (2) vertical rotating disks or drums as a first transfer unit 61 and a second transfer unit 62, but may distinguish one (1) transfer unit of one (1) vertical rotating disk or drum according to an angle, to indicate a first transfer unit 61 and a second transfer unit 62.

In this case, the tablet discharging unit 70 may be disposed on a circumferential lateral surface of the transfer unit in a direction from top to bottom, in a vertical rotating disk or drum rotating in a clockwise direction, and may be installed within a certain angle range to facilitate discharging each of the tablets.

Alternatively, according to another embodiment of the present disclosure, a transfer unit 60 may have a belt structure for horizontal transfer in the form of a conveyor belt. Tablets may be placed on an upper portion of a first horizontal conveyor belt 61 and may be transferred with one surface of each of the tablets contacting the upper portion. The tablets may be moved to a lower portion of a second horizontal conveyor belt 62 connected to the first horizontal conveyor belt, and the tablets may be adsorbed and moved without reversing positions of the tablets to be transferred with the other surface of each of the tablets being exposed externally. A pre-printing image-capturing unit 10, a tablet printing unit 40, post-printing image-capturing units 20 and 30, and a tablet discharging unit 70 may be also arranged on an upper portion or a lower portion of a conveyor belt, to print and inspect the tablets.

Alternatively, a transfer unit 60 may be installed to have a form of a conveyor belt rotating in an infinite orbital shape. A pre-printing image-capturing unit 10, a tablet printing unit 40, post-printing image-capturing units 20 and 30, and a tablet discharging unit 70 may be also arranged on an upper portion or a lower portion of the transfer unit 60 which may be a conveyor belt, to print and inspect tablets being transferred.

All of the above-described transfer units may include a section in which a negative pressure is applied and a section in which a positive pressure is applied, in the transfer units transferring tablets, to transfer the tablets by adsorption. Therefore, overlapped explanations will be omitted for simplicity.

The transfer unit may be configured according to an embodiment or a combination of embodiments of the present disclosure. When the transfer unit is a transfer unit 60 capable of exposing upper and lower portions of a tablet to print the tablet and inspect an exterior of the tablet, and a transfer unit using adsorption and a transfer unit using non-adsorption may be included in the present disclosure.

In addition, the transfer unit may have different configurations, depending on a transfer path of a transfer unit, or may have different configurations, depending on transfer paths of a plurality of transfer units, and is thus not limited to the above-described embodiments.

Embodiments of the transfer unit 60 are illustrative only, and are not limited thereto, and may include configurations, not contradict embodiments of the present disclosure.

Hereinafter, a transfer unit according to an embodiment of the present disclosure will be described, assuming that the transfer unit includes a first transfer unit 61 and a second transfer unit 62, but the above assumption is illustrative only. A transfer unit 60 may be applied, unless contradictory.

When tablets are supplied from the tablet supplier 50 to the first transfer unit 61, an image of each of the tablets may be captured by a pre-printing image-capturing unit 10 including a position tracking camera. When a state of each of the tablets sensed from the captured image is transferred to a tablet printing unit 40, the tablet printing unit 40 may accurately print one surface of each of the tablets being transferred by the first transfer unit 61.

In addition, a first post-printing image-capturing unit 20 may capture an image of one surface of each of the printed tablets and an image of a lateral edge portion of the one surface, to firstly discriminate whether exteriors of the tablets are defective, and may transfer the tablets to a second transfer unit 62 adsorbing one surfaces of tablets transferred from the first transfer unit 61 and reversing orientations of the tablets, and a second post-printing image-capturing unit 30 may capture an image of the other surface, opposing the one surface of each of the printed tablets, and an image of a lateral edge portion of the other surface, to secondly discriminate whether exteriors of the tablets are defective.

In addition, when tablets are discriminated as a good product, the tablets may be discharged through a good product-discharging port, and when tablets are discriminated as a defective product, the tablets may be discharged through a defective product-discharging port.

A tablet discharging unit 70 according to an embodiment of the present disclosure may include at least one air injector installed along the transfer unit 60, and at least one of defective product-discharging port and good product-discharging port, outside of the suction hole of the transfer unit 60.

Specifically, when an air injector for discharging tablets is placed inside the suction hole, a distance between the air injector and the tablets may be relatively short and improve accuracy for discharging the tablets, but it may be very difficult to have air injecting force sufficient to discharge the tablets through the suction hole in which positive and negative pressures are formed. Therefore, an air injector may be installed outside of the tablets to increase a rate of discharging the tablets.

When it is not easy to discharge tablets even with the air injector externally, at least one air injector, externally, and at least one air injector, inside of the suction hole, may be installed to increase efficiency and accuracy of discharging the tablets.

A tablet discharging unit 70 according to an embodiment of the present disclosure may be located on an end portion of a second transfer unit 62, to discharge tablets being transferred for which good and defective products has been discriminated along the second transfer unit 62, and may install at least one air injector on a support member having a curved surface along a transfer unit, which may be a rotation plate, in a state of being supported by a separate vertical bracket, such that a good product and a defective product may be injected from a good product-discharging port and a defective product-discharging port by injecting air, respectively, to classify and discharge the tablets through each of the discharging ports.

Alternatively, according to another embodiment of the present disclosure, at least one air injector may be displaced in a second transfer unit 62 having a form of a vertical rotating disk or drum, according to an angle in a circumferential direction of the second transfer unit 62. In addition, air injector may be displaced within constant angles in a vertical direction, for example, at an angle respectively having sixty (60) and sixty (60) degrees in upward and downward directions, based on a diameter of the vertical rotating disk parallel to a bottom surface as zero (0) degree, to classify tablets as and discharge the classified tablets through a defective product-discharging port and a good product-discharging port, which are arranged to pass through a pre-printing image-capturing unit 10, a tablet printing unit 40, and post-printing image-capturing units 20 and 30, arranged in a circumferential direction of the vertical rotating disk.

In this case, the limitations of angle may be established due to reasons explained below. Since tablets may be extracted while flying upwardly the tablets at an angle exceeding 60 degrees in an upward direction, it may not be easy to receive the upwardly flying tablets by the discharging port. When the tablet discharging unit is installed in a direction, rotating from bottom to top, in a disk or drum rotating vertically in a clockwise direction, tablets may move and proceed upwardly, and may be thus difficult to discharge the tablets due to the upwardly flying tablets. Therefore, an angle in a position in which the tablet discharging unit is installed may be limited.

Alternatively, according to another embodiment of the present disclosure, a second transfer unit 62 in a form of a horizontal conveyor belt may transfer tablets discriminated as good products to a first line and tablets discriminated as defective products to a second line. Thereafter, the tablets may be respectively discharged to a good product-discharging port and a defective product-discharging port in an end portion of the belt. Alternatively, after discriminating good or defective products in the end portion of the belt, the good product may be classified and discharged to a good product-discharging port, and the defective product may be classified and discharged to a defective product-discharging port.

According to an embodiment of the present disclosure, precise printing may be performed in a state in which a surface of a tablet to be printed is exactly identified by a pre-printing image-capturing unit, printing of the tablet and defects of an entire exterior of the tablet may be inspected to accurately print the tablet, only good products that do not have foreign substances or cracks on the exterior may be classified and extracted to increase efficiency, and the printing of the tablet and the inspection of the exterior of the tablet may be performed using a single device. Therefore, work efficiency may be increased and costs may be reduced.

In addition, the above-described embodiment has been described as the second transfer unit 62, but is not limited thereto. Tablets being transferred may be classified and discharged to the transfer unit 60, along the tablet discharging unit 70 located in an end portion along the transfer path of the transfer unit 60.

Figure 6:
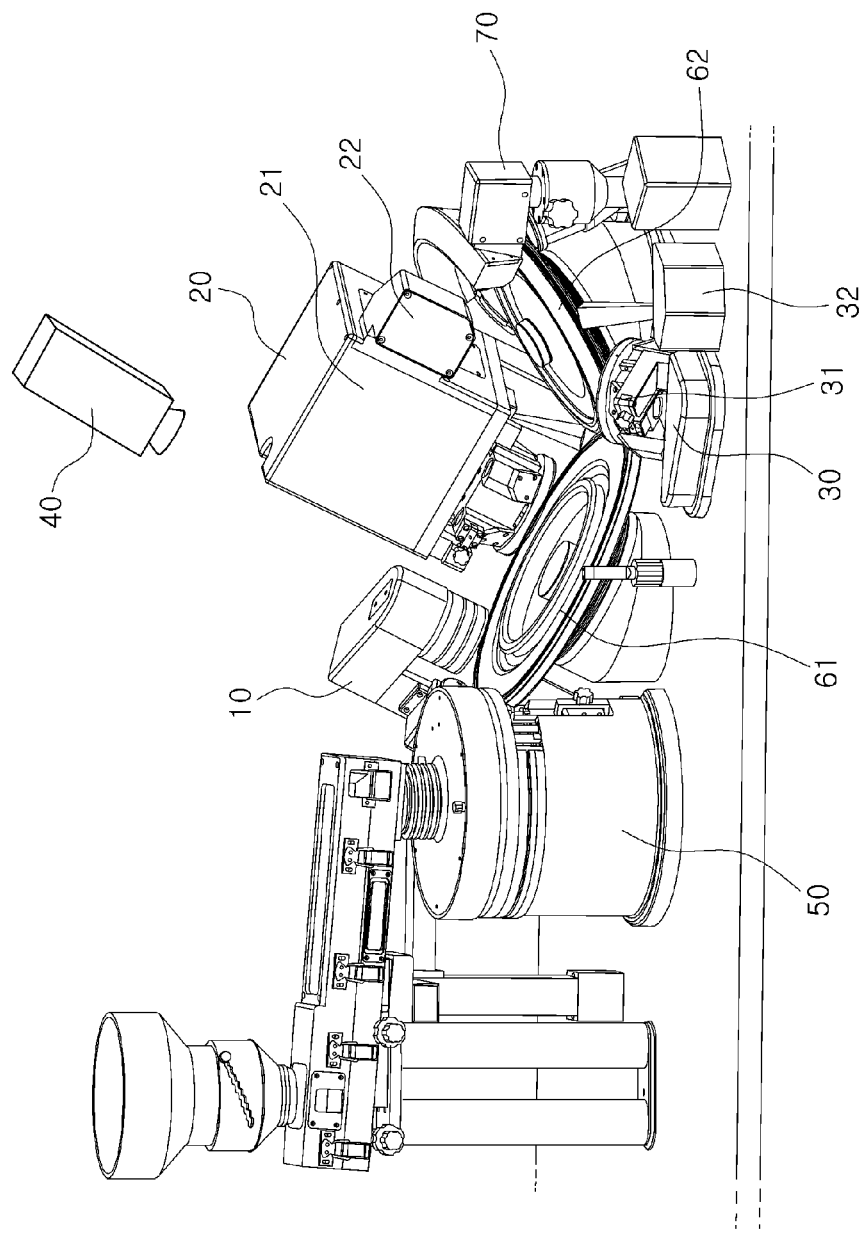
FIG. 6 illustrates a specific device according to an embodiment of the present disclosure.

FIG. 6 illustrates a device printing a tablet and inspecting an exterior of the tablet, including a first rotation tray and a second rotation tray as a first transfer unit 61 and a second transfer unit 62, respectively, and illustrates a specific embodiment according to an embodiment of the present disclosure that may simultaneously print a tablet and inspecting the printing and an exterior of the tablet in a batch. For convenience of explanation, overlapped explanations will be omitted, and the above-described embodiments may not be excluded, unless contradictory.

As illustrated in FIG. 6, when tablets are supplied from a tablet supplier 50 to a first transfer unit 61, which may be a rotation tray, a pre-printing image-capturing unit 10, including a position tracking camera, may capture an image of an exterior of each of the tablets, a state of the tablet sensed from the captured image may be transferred to a controller, and then the controller may control a tablet printing unit 40 to accurately print one surface of each of the tablets being transferred by the first transfer unit 61.

In this case, the pre-printing image-capturing unit 10 may be disposed adjacent to the tablet supplier 50 on a transfer path of a transfer unit 60, a support member may be placed on a lateral surface of the transfer unit 60, and a support bracket facing an upper portion of the transfer unit 60 may be installed to be disposed to oppose the tablets. A camera may be installed in the support bracket. Alternatively, a mirror unit may be installed in the support bracket to adjust a direction of a laser beam from a laser camera and the laser camera may be installed externally. The laser beam of the laser camera may be configured to pass through an internal hole of the support bracket and the mirror unit to irradiate the tablets. Therefore, the pre-printing image-capturing unit 10 may face and capture an image of one surface of each of the tablets placed in the transfer unit 60.

In this case, the pre-printing image-capturing unit 10 may be disposed along the transfer path of the transfer unit 60, and is preferably disposed on a transfer path of the first transfer unit 61 in the transfer unit 60.

For example, the pre-printing image-capturing unit 10 may include a laser camera for position tracking, may acquire image information by capturing an image of each of the tablets by the camera, and may transmit the acquired image information to the controller. In this case, the controller may process the acquired image information to recognize positions of the tablets on the transfer unit 60 in an X-Y coordinate, and may check a degree of rotation or inclination along a line of an exterior of each of the tablets.

The controller may command to calculate a rotation value and a position correction value of the tablet printing unit 40 in order to correct a position of the tablet printing unit 40, which has been aligned with a center of a previous tablet prior to a current tablet, in real time, to adjust a mirror in the tablet printing unit 40, and may control a irradiation position and a irradiation amount of a laser beam facing the tablet printing unit 40.

Specifically, the controller may recognize shapes of exteriors of the tablets from the images of the exteriors of the tablets transmitted from the pre-printing image-capturing unit 10, to immediately derive a control value of the tablet printing unit 40 according to results learned from images of the exteriors of conventional tablets, and a rotation value of the mirror in the tablet printing unit 40 may be thus calculated such that the laser beam is irradiated to a center of the current tablet without moving the tablet printing unit 40. Therefore, waste of time due to the movement of the tablet printing unit 40 may be reduced, and precise control of the tablet printing unit 40 may be immediately carried out only by adjusting the mirror unit, to maximize effects of the present disclosure of capturing images of exteriors of tablets being transferred and printing the tablets.

In this case, the controller may acquire the images of exteriors of the tablets being transferred, obtained by the pre-printing image-capturing unit 10 or a camera of a tablet surface inspector, to additionally determine whether surfaces of the tablets, before printing, are defective.

A tablet printing unit 40 according to an embodiment of the present disclosure may perform precise printing a tablet to be printed within an error of 100 μm, spaced apart from a reference point of the tablet. The tablet printing unit 40 may be disposed next to the pre-printing image-capturing unit 10 along the transfer direction of the transfer unit 60, and disposed to oppose the tablet, to print the tablet disposed on the transfer unit 60.

The tablet printing unit 40 may be preferably disposed close to the transfer unit 60, but may be disposed to be spaced apart from the transfer unit 60 at a certain distance or more for space utilization. According to an embodiment of the present disclosure, in order to maximize and manage efficiently space utilization, the tablet printing unit 40 may be disposed to be inclined at the same angle as an inclined angle of the transfer unit 60. Alternatively, in a case of a vertical rotating disk type transfer unit, the tablet printing unit 40 may be installed in a direction, perpendicular to a line tangent to a circumferential surface. In addition, the tablet printing unit 40 may be provided such that a laser beam is irradiated in a predetermined radius to reach the transfer unit 60, based on the transfer unit 60.

A tablet printing unit 40 according to an embodiment of the present disclosure may irradiate a laser beam to a tablet using a UV laser, to perform laser printing. In this case, oxygen from a coating component of the tablet may be removed and an oxygen ratio of the tablet may be changed, to cause a color change from white to gray. Even when the color change occurs, an irradiation amount of the laser beam from the tablet printing unit 40 may be adjusted to change only an oxygen ratio of the coating component of the tablet. Therefore, components of the tablet may not be affected to print the tablet safely.

Further, a tablet printing unit 40 according to another embodiment of the present disclosure may print tablets by an inkjet method. A method of printing tablets is not limited to the above-described embodiments, and a person skilled in the art may use a printing method capable of being derived, substituted, or changed.

A post-printing image-capturing unit may include a first post-printing image-capturing unit 20 and a second post-printing image-capturing unit 30, and may inspect an entire exterior of a three-dimensional tablet by a plurality of post-printing image-capturing units. When a tablet supplied from a tablet supplier is provided on a first transfer unit 61, image information of the exterior of the tablet may be obtained by the first post-printing image-capturing unit 20, and when the tablet is provided on a second transfer unit 62, reversing and transferring the tablet, image information of the exterior of the tablet may be obtained by the second post-printing image-capturing unit 30.

A first post-printing image-capturing unit 20 may include a first camera unit placed on a lateral surface of an inclined first rotation tray 61 and including at least one camera for acquiring image information of a region including a first surface of an upper surface of a tablet being transferred onto the first rotation tray 61, and a second camera unit disposed to oppose the first camera unit with the tablet interposed therebetween and including at least one camera for acquiring image information of a region including a second surface of the upper surface of the tablet being transferred onto the first rotation tray 61.

For example, a first post-printing image-capturing unit 20 may include a first camera simultaneously capturing images of upper and left sides of an elliptical tablet diagonally with regard to an upper surface of the elliptical tablet, and a second camera simultaneously capturing images of lower and right sides of the elliptical tablet diagonally with regard to the upper surface of the elliptical tablet. Preferably, the first post-printing image-capturing unit 20 includes four (4) cameras 21 for capturing diagonally images of the upper, right, lower, and left sides of the elliptical tablet diagonally with regard to the upper surface of the elliptical tablet. In addition, the first post-printing image-capturing unit 20 may further include a third camera unit 22 disposed to oppose an upper side of a transfer surface of the first rotation tray 61, to acquire image information on upper surfaces of tablets being transferred. The third camera unit 22 may be disposed on the upper side of the transfer path of the first rotation tray 61 to which the tablets are transferred, and may capture images of upper surfaces of the tablets by a capturing window of the third camera unit 22.

In this case, the third camera unit 22 may be a 2D camera, and is preferably a 3D camera capable of capturing images of the entire upper surfaces of the tablets.

In addition, the second post-printing image-capturing unit 30 may capture images of lower surfaces of the tablets at a second image-capturing original point on the second rotation tray 62 adjacent at an intersection of the first rotation tray 61 and the second rotation tray 62.

The second post-printing image-capturing unit 30 may be disposed adjacent to the intersection of the first rotation tray 61 and the second rotation tray 62, and may be disposed on a lower surface of the second rotation tray 62 to acquire image information of the lower surfaces of the tablets that has been reversely transferred to the second rotation tray 62. The second post-printing image-capturing unit 30 may include a fourth camera unit including at least one camera for acquiring image information of a region including a first lateral surface of a lower surface of a tablet being transferred onto the second rotation tray 62, and a fifth camera unit disposed to oppose the fourth camera unit with the tablet interposed therebetween and including at least one camera for acquiring image information of a region including a second lateral surface of the lower surface of the tablet being transferred onto the second rotation tray 62.

The fourth camera unit may be disposed adjacent to a boundary portion that may be an intersection between the first rotation tray 61 and the second rotation tray 62, to capture an image of the lower surface of the tablet in a state in which an upper surface of the tablet is adsorbed to the second rotation tray 62.

For example, the second post-printing image-capturing unit 30 may include a fourth camera simultaneously capturing images of upper and left sides of an elliptical tablet diagonally with regard to a lower surface of the elliptical tablet, and a fifth camera simultaneously capturing images of lower and right sides of the elliptical tablet diagonally with regard to the lower surface of the elliptical tablet. Preferably, the second post-printing image-capturing unit 30 includes four (4) cameras 31 for capturing diagonally images of the upper, right, lower, and left sides of the elliptical tablet diagonally with regard to the upper surface of the elliptical tablet. In addition, the second post-printing image-capturing unit 30 may further include a third camera 32 disposed to oppose an upper side of a transfer surface of the second rotation tray 62, to acquire image information on lower surfaces of tablets being transferred.

In this case, the third camera 32 may be a 2D camera, and is preferably a 3D camera capable of capturing images of the entire lower surfaces of the tablets.

The collecting the image information of the lower surfaces of the tablets in a region adjacent at an intersection between the first rotation tray 61 and the second rotation tray 62 may secure the time for transferring the tablets onto the second rotation tray 62 and secure the time for discriminating whether the lower surfaces of the tablets are defective, based on the image information of the lower surfaces of the tablets, to be easily classified and transferred to a good product-discharging port and a defective product-discharging port, arranged next to and after the second rotation tray 62.

Therefore, based on the images of the tablets captured by the first post-printing image-capturing unit 20 and the second post-printing image-capturing unit 30, it may be discriminated whether the exteriors of the tablets are defective, and defective and good products may be discharged through the discharging ports while being transferred through the second transfer unit 62.

The discharging ports of the tablet discharging unit 70 may be located on an opposite side of a contact point of the first transfer unit 61 and the second transfer unit 62, to classify the tablets as good and defective products and discharge the tablets. As a distance between the second post-printing image-capturing unit 30 and the discharging port is secured, the tablets may be discharged after an accurate determination of good or defective products. This is only illustrative, and is not limited.

According to an embodiment of the present disclosure, precise printing may be performed in a state in which a surface of a tablet to be printed is exactly identified by a pre-printing image-capturing unit, printing of the tablet and defects of an entire exterior of the tablet may be inspected to accurately print the tablet, only good products that do not have foreign substances or cracks on the exterior may be classified and extracted to increase efficiency, and the printing of the tablet and the inspection of the exterior of the tablet may be performed using a single device. Therefore, work efficiency may be increased and costs may be reduced.

Figure 7:
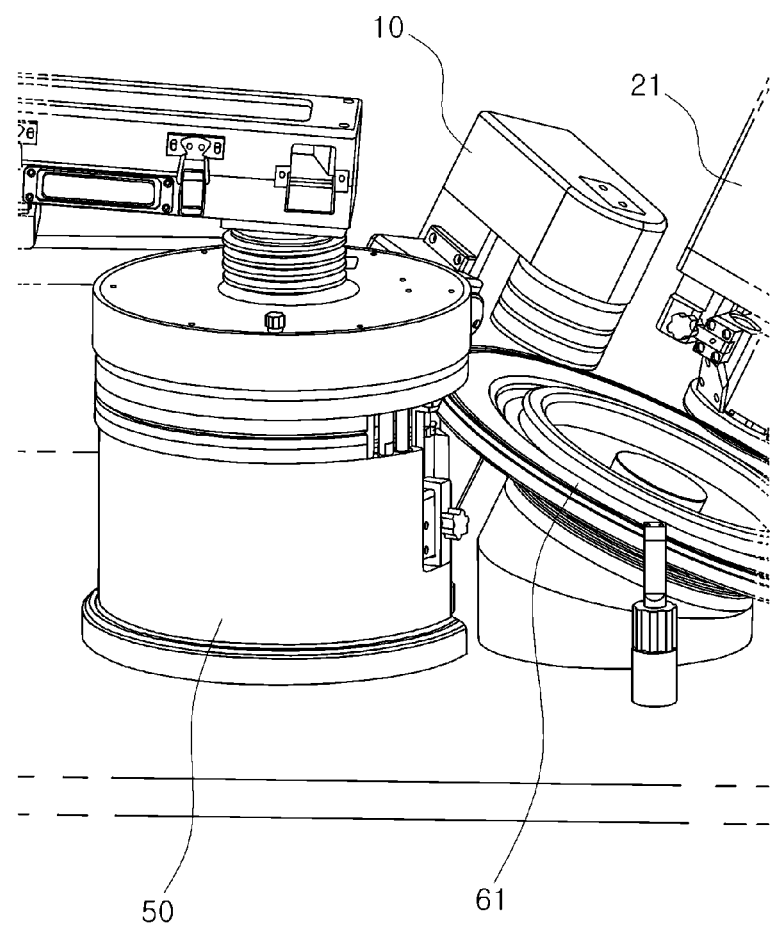
FIG. 7 is an enlarged view of a device for printing tablets, according to an embodiment of the present disclosure.
Figure 8:
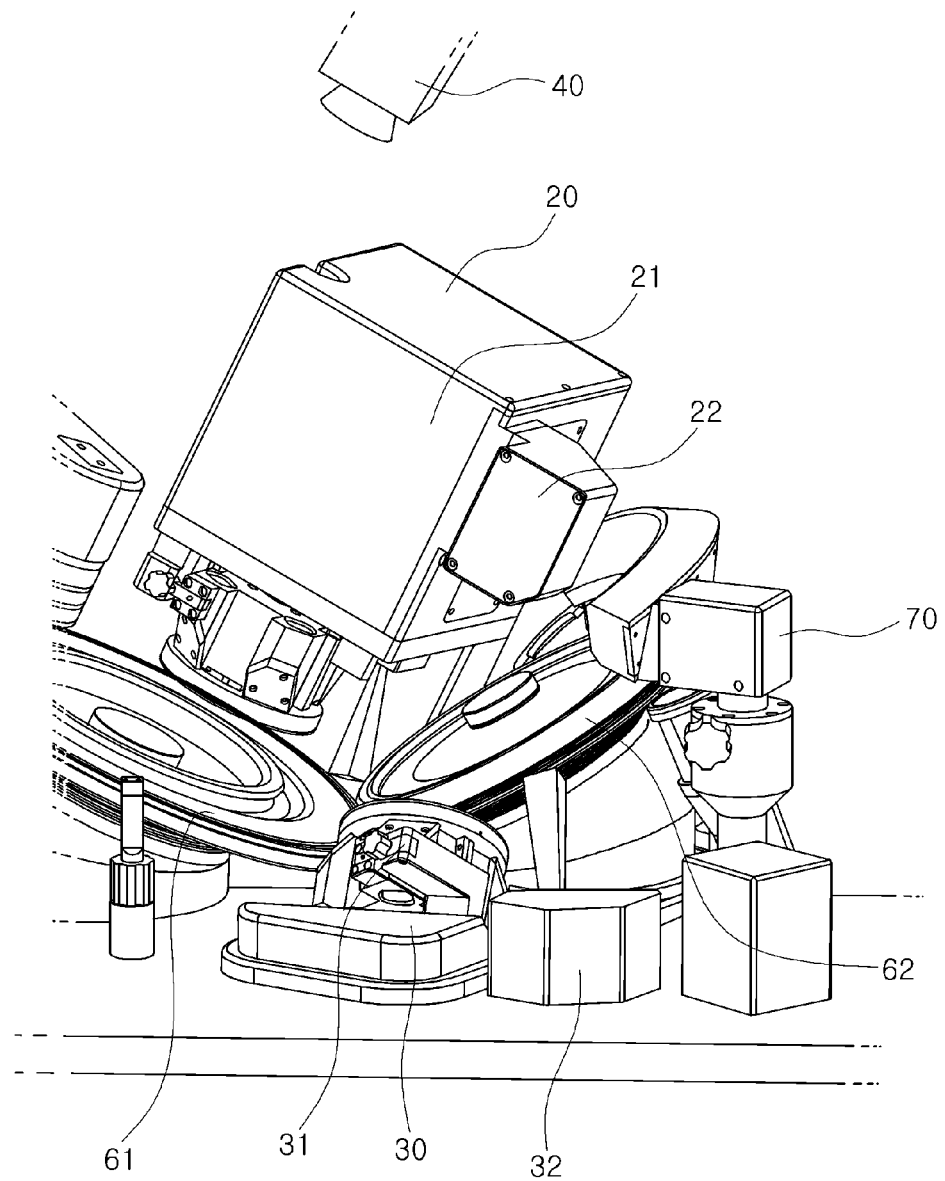
FIG. 8 is an enlarged view of a device for inspecting exteriors of tablets, according to an embodiment of the present disclosure.

FIGS. 7 and 8 are enlarged views illustrating the device according to an embodiment of the present disclosure, illustrated in FIG. 6, divided into a device for printing a tablet and a device for inspecting an exterior of the tablet.

According to an embodiment of the present disclosure, transfer units 61 and 62 arranging and transferring tablets supplied from a tablet supplier 50 in a line; a pre-printing image-capturing unit 10 disposed on transfer paths of the transfer units 61 and 62 and capturing images of exteriors of the tablets being transferred and sensing states of the tablets to be printed; a tablet printing unit 40 located next to the pre-printing image-capturing unit 10 along the transfer paths of the transfer units 61 and 62, and discriminating positions and orientations of the tablets, based on the images captured by the pre-printing image-capturing unit, and correcting positions of the tablets and printing the tablets, based on the discriminated results; and a post-printing image-capturing unit including a first post-printing image-capturing unit 20 located next to the tablet printing unit 40 along the transfer paths of the transfer unit 61 and 62, and capturing and inspecting images of exteriors of first surfaces and first lateral edge portions of tablets being transferred, which are printed surfaces of the tablets, and a second post-printing image-capturing unit 30 capturing and inspecting images of exteriors of second surfaces, opposing the first surfaces, and second lateral edge portions.

In this case, the transfer units 61 and 62 may include a first transfer unit 61 for transferring the tablets supplied from the tablet supplier and a second transfer unit 62 for reversing orientations of the tablets received from the first transfer unit 61 to transfer the tablets. The pre-printing image-capturing unit 10 and the tablet printing unit 40 may be installed on a transfer path of the first transfer unit 61.

Specifically, as illustrated in FIGS. 7 and 8, tablets supplied from the tablet supplier 50 by a hopper may be aligned in a line by centrifugal force, and may be supplied to the first transfer unit 61 which may be a rotation tray. When supplying tablets from the tablet supplier 50 to the first transfer unit 61, the first transfer unit 61 may not be fixed and may be moved, and there may be in a certain distance between the tablet supplier 50 and the first transfer unit 61. Therefore, all of the tablets cannot be supplied in the same position and orientation, and there may be a certain range of positional errors.

Therefore, the pre-printing image-capturing unit 10 may capture images of tablets being adsorbed and transferred by the first transfer unit 61, to obtain information on current positions and orientations of the tablets and transfer the obtained information to the tablet printing unit 40, to increase printing accuracy.

A pre-printing image-capturing unit 10 according to an embodiment of the present disclosure may include a camera equipped with a position tracking sensor, and may acquire images of exteriors of the tablets being transferred by the camera, to recognize positions of the tablets, and may transfer tablet information including at least one of information on orientations, shift changes, and rotations of the tablets obtained from the acquiring the images, to the controller, and the controller may calculate a correction value including a position change value and a rotation value of the tablet printing unit 40 in real time, based on the tablet information, and may control a laser irradiation position and a laser irradiation amount of the tablet printing unit 40, based on the correction value.

In this case, the controller may learn a correction value according to the obtained tablet information, and may control the tablet printing unit 40 to minimize a change in positions of the tablets to be printed, according to changes in rotations and shifts of the tablets.

In addition, a tablet printing unit 40 according to an embodiment of the present disclosure may be installed above the pre-printing image-capturing unit 10 and the post-printing image-capturing units 20 and 30 to perform laser printing, and may print tablets being transferred between the pre-printing image-capturing unit 10 and the post-printing image-capturing units 20 and 30.

More specifically, a device for printing and inspecting tablet according to an embodiment of the present disclosure may include a base frame, and a tablet supplier 50 disposed on the base frame and arranging tablets supplied by a hopper in a line by centrifugal force. The pre-printing image-capturing unit 10 may be disposed on one side of the tablet supplier 50, may capture images of tablets being discharged from the tablet supplier 50 and being transferred to pass through the post-printing image-capturing units 20 and 30. The tablet printing unit 40 may adjust an internal mirror unit according to information obtained by the pre-printing image-capturing unit 10 to print tablets at certain positions of the tablets, to irradiate a laser beam.

For example, the pre-printing image-capturing unit 10 may be disposed on one side of the tablet supplier 50, and may capture images of tablets being discharged from the tablet supplier 50 to pass through the first post-printing image-capturing unit 20 and the second post-printing image-capturing unit 30. The controller may update and learn exterior information of the tablets such that the pre-printing image-capturing unit 10 adjusts the internal mirror unit in the tablet printing unit 40 according to the rotation information and shift information of the tablets, to print central portions of the tablets, and may thus improve printing accuracy and speed.

In addition, the installation of the tablet printing unit 40 above the upper surface of the post-printing image-capturing units 20 and 30 may be spaced apart from the tablets, as compared to the printing on one side of the first transfer unit 61 and one side of the second transfer unit 62, to deteriorate printing accuracy and speed. In order to increase space efficiency of the device, the tablet printing unit 40 may be installed on an upper portion of the device. This is only illustrative, and the tablet printing unit 40 may be installed on one side of the transfer units 61 and 62 to oppose the transfer unit 60.

When the tablet printing unit 40 is installed above the upper surfaces of the post-printing image-capturing units 20 and 30, the tablet printing unit 40 may perform laser printing as a laser printing unit, and the laser grooves may be provided in devices on a laser path. For example, as illustrated in FIG. 8, when the tablet printing unit 40 is installed above the upper surface of the first post-printing image-capturing unit 20, the first post-printing image-capturing unit 20 may provide semi-cylindrical grooves on one lateral surface thereof not to obstruct the laser path of be the tablet printing unit 40.

As illustrated in FIG. 8, a device for inspecting exteriors of tablets according to an embodiment of the present disclosure may include a first post-printing image-capturing unit 20 and a second post-printing image-capturing unit 30. The first post-printing image-capturing unit 20 may include a 2D camera unit 21 for capturing images of front portion of one surface of a tablet and front and rear lateral edge portions of one surface of the tablet from the top, and a 3D camera unit 22 for capturing an image of an entire shape of the one surface of the tablet from the top. The second post-printing image-capturing unit 30 may include a 2D camera unit 31 for capturing images of front portion of the other surface of the tablet and front and rear lateral edge portions of the other surface of the tablet from the bottom, and a 3D camera unit 32 for capturing an image of an entire shape of the other surface of the tablet from the bottom.

The first post-printing image-capturing unit 20 may capture an image of a first surface of a tablet in a state in which a second surface of the tablet is adsorbed to the first transfer unit 61. The first post-printing image-capturing unit 20 may include one (1) camera 22 for capturing an image of a front portion of the first surface, and four (4) 2D cameras 21 for capturing images of front and rear lateral edge portions of the first surface. The camera may be a 2D camera 21 of the first post-printing image-capturing unit 20.

In addition, the 3D camera 22 of the first post-printing image-capturing unit 20 may be additionally installed on the 2D camera 21 of the first post-printing image-capturing unit 20 to capture images of the entire exterior and shape of the tablet, and may be additionally discriminated whether a tablet is defective, such as whether a crack is in an exterior of the tablet, whether a piece of the tablet is generated due to breakage of the tablet, or the like.

For example, the first post-printing image-capturing unit 20 may include a 2D camera 21 of the first post-printing image-capturing unit 20 and a 3D camera 22 of the first post-printing image-capturing unit 20. The first post-printing image-capturing unit 20 may check for defects in the exteriors of the front portion and the front and rear lateral edge portions of the first surface of the tablet by capturing images thereof, and may check whether the printing of the tablet is carried out in the central portion without being biased toward the outside.

Since a surface of the first transfer unit 61 to which a tablet is adsorbed may not be inspected, the tablet may be transferred to the second transfer unit 62. In this case, an orientation of the tablet may be reversed, to adsorb a first surface of the tablet to the second transfer unit 62, and capture an image of a second surface of the tablet by the second post-printing image-capturing unit 30.

A second post-printing image-capturing unit 30 according to an embodiment of the present disclosure may include a 2D camera unit 31 of the second post-printing image-capturing unit 30 for capturing images of front portion and front and rear lateral edge portions of the second surface of the tablet, and a 3D camera 32 of the second post-printing image-capturing unit 30 for capturing an image of an entire exterior and shape of the tablet, in a manner similar to the first post-printing image-capturing unit 20. A description of the second post-printing image-capturing unit 30 overlapping that of the first post-printing image-capturing unit 20 may be omitted for simplicity.

According to an embodiment of the present disclosure, a controller may be further included. The controller may control an internal mirror unit of the tablet printing unit 40, depending on the images obtained from the pre-printing image-capturing unit 10, may acquire the image captured by the first post-printing image-capturing unit 20 to firstly discriminate whether exteriors of the tablets are defective, and may acquire the image captured by the second post-printing image-capturing unit 30 to secondly discriminate whether exteriors of the tablets are defective, to determine a discharging port to which the tablet is discharged. In this case, tablets that have been finally discriminated as good products may be extracted through a good product-discharging port, and may be classified. In addition, tablets that have been finally discriminated as defective products may be extracted through a defective product-discharging port, and may be classified.

Specifically, the controller may compare whether a character boundary line of a printed portion on a first surface of a tablet, captured by the first post-printing image-capturing unit 20, and a character boundary line to be intended for printing are the same, and may determine whether a position of the character boundary line of the printed portion is in a central portion of the tablet, to discriminate whether the printed surface of the tablet is good.

Alternatively, the controller may inspect an external boundary and a surface of a tablet, captured by the first post-printing image-capturing unit 20, to discriminate whether the tablet is good.

Therefore, a device for printing and inspecting a tablet, performing essential tablet printing in a production process of the tablet and simultaneously printing the tablet and inspecting an exterior of the tablet, to classify good and defective products, may improve work efficiency, and may perform a plurality of tasks with a single device. Therefore, efficiency in time and space may be maximized.

Figure 9:
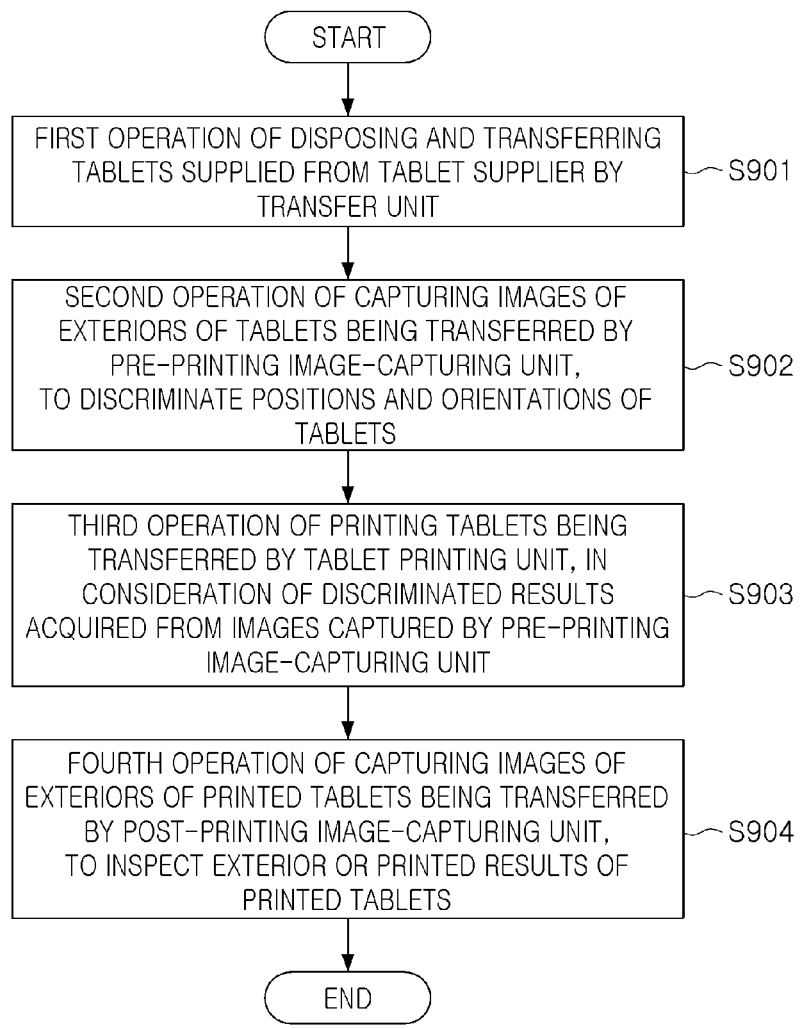
FIG. 9 is a flowchart illustrating a method for printing a tablet and inspecting an exterior of the tablet, according to an embodiment of the present disclosure.

According to another aspect of the present disclosure, a method for printing a tablet and inspecting an exterior of the tablet may be provided, and FIG. 9 is a flowchart illustrating a method for printing a tablet and inspecting an exterior of the tablet, according to an embodiment of the present disclosure. Hereinafter, overlapped explanations will be omitted for simplicity.

In S901, tablets supplied from a tablet supplier 50 by a transfer unit 60 may be disposed and transferred in a line.

In S902, a pre-printing image-capturing unit 10 may capture images of exteriors of the tablets being transferred to discriminate positions and orientations of the tablets.

In this case, an operation of capturing images of surface conditions of the tablets, before printing, to determine whether surfaces of the tablets are defective may be further included.

In S903, a tablet printing unit 40 may correct positions of the tablets being transferred, based on discriminated results acquired from images captured by the pre-printing image-capturing unit 10, and may print the corrected tablets.

In S904, post-printing image-capturing units 20 and 30 may capture images of exteriors of the printed tablets being transferred to inspect entire exteriors of the printed tablets.

S901 to S904 may be performed by at least one of a first transfer unit and a second transfer unit, or may be performed by one (1) transfer unit.

Therefore, essential tablet printing may be performed in a production process of the tablet, and the tablet may be printed and an exterior of the tablet may be inspected, simultaneously, to classify good and defective products and maximize work efficiency.

According to an embodiment of the present disclosure, after printing tablets, defects on exteriors of the tablets such as defective printing of the tablets, presence of cracks of the tablets, or the like, may be collectively inspected to increase work efficiency, and a previous tablet sensing may be performed by an image-capturing operation, before printing, to maximize printing precision and accuracy.

While example embodiments have been illustrated and described above, it will be apparent to those skilled in the art that modifications and variations could be made without departing from the scope of the present invention as defined by the appended claims.

What is claimed is:

1. A device for printing a tablet and inspecting an exterior of the tablet, comprising:
   a transfer unit arranging and transferring tablets supplied from a tablet supplier in a line;
   a pre-printing image-capturing unit located on a transfer path on which the tablets are transferred to discriminate positions and orientations of the tablets, and disposed to capture images of exteriors of the tablets being transferred;
   a tablet printing unit located next to the pre-printing image-capturing unit on the transfer path on which the tablets are transferred, and printing the tablets being transferred, in consideration of discriminated results acquired from the images captured by the pre-printing image-capturing unit; and
   a post-printing image-capturing unit located next to the tablet printing unit on the transfer path on which the tablets are transferred, and capturing images of exteriors of the printed tablets being transferred, to inspect the images or printed results of the printed tablets;

wherein the pre-printing image-capturing unit acquires images of exteriors of the tablets being transferred, to recognize positions of the tablets, and transfers tablet information including information on orientations, shift changes, and rotations of the tablets obtained from the acquiring the images, to a controller, and the controller calculates a correction value including a position change value and a rotation value of the tablet printing unit in real time, based on the tablet information, and controls a laser irradiation position or a laser irradiation amount of the tablet printing unit, based on the correction value, and the post-printing image-capturing unit performs capturing images of at least one of a lateral surface and lateral edge of the tablet being transferred and an upper or lower surface of the tablet, wherein the tablet printing unit is configured to see a UV laser, and wherein the controller compares whether a character boundary line of a printed portion on the one surfaces of the tablets, captured by the post-printing image-capturing unit, and a character boundary line to be intended for printing are the same, and inspects whether a position of the character boundary line of the printed portion on the one surfaces of the tablets is in a central portion of each of the tablets, to discriminate whether the printed surface of each of the tablets is good.

2. The device of claim 1, wherein the pre-printing image-capturing unit further comprises a tablet surface inspector capturing images of surface conditions of the tablets, before printing, to determine whether surfaces of the tablets are defective.

3. The device of claim 1, wherein the transfer unit comprises a first transfer unit transferring the tablets supplied from the tablet supplier, and a second transfer unit reversing orientations of the tablets received from the first transfer unit and transferring the reversed tablets.

4. The device of claim 3, wherein the pre-printing image-capturing unit comprises a first pre-printing image-capturing unit and a second pre-printing image-capturing unit, wherein the first pre-printing image-capturing unit previously capturing images of first surfaces of the tablets is disposed on a transfer path on which the tablets of the first transfer unit are transferred, and the second pre-printing image-capturing unit capturing images of second surfaces of the tablets, opposing the first surfaces, is disposed on a transfer path on which the tablets of the second transfer unit in which orientations of the tablets are reversed are transferred.

5. The device of claim 4, wherein the tablet printing unit is disposed along the transfer path of at least one of the first transfer unit and the second transfer unit.

6. The device of claim 4, wherein the post-printing image-capturing unit comprises a first post-printing image-capturing unit and a second post-printing image-capturing unit, wherein the first post-printing image-capturing unit capturing images of entire exteriors of the tablets, based on the first surfaces of the tablets, is disposed on the transfer path on which the tablets of the first transfer unit are transferred, and the second post-printing image-capturing unit capturing images of entire exteriors of the tablets, based on the second surfaces of the tablets, opposing the first surfaces, is disposed on the transfer path on which the tablets of the second transfer unit in which the orientations of the tablets are reversed are transferred.

7. The device of claim 6, wherein the tablet printing unit comprises a first tablet printing unit printing the first surfaces of the tablets, which are one surfaces of the tablets, and a second tablet printing unit printing the second surfaces of the tablets, opposing the first surfaces, in which orientations of the tablets are reversed, wherein the device comprises:

the first pre-printing image-capturing unit, the first tablet printing unit, and the first post-printing image-capturing unit, arranged on the transfer path on which the tablets of the first transfer unit are transferred; and the second pre-printing image-capturing unit, the second tablet printing unit, and the second post-printing image-capturing unit, arranged on the transfer path on which the tablets of the second transfer unit in which the orientations of the tablets are reversed are transferred.

8. The device of claim 6, wherein the first post-printing image-capturing unit captures images of exteriors of first surfaces and first lateral edges, which are printed surfaces of the tablets being transferred, to inspect the exteriors of first surfaces and first lateral edges, and the second post-printing image-capturing unit captures images of exteriors of second surfaces, opposing the first surfaces, and second lateral edges, to inspect the exteriors of second surfaces and second lateral edges.

9. The device of claim 6, wherein at least one of the first post-printing image-capturing unit and the second post-printing image-capturing unit comprises a 2D camera unit capturing images of the one surfaces and front and rear lateral edge portions of the one surfaces of the tablets from the top; and a 3D camera unit capturing images of entire shapes of the one surfaces of the tablets from the top, and wherein remaining one of the first post-printing image-capturing unit and the second post-printing image-capturing unit comprises a 2D camera unit capturing images of the other surfaces and front and rear lateral edge portions of the other surfaces of the tablets from the bottom; and a 3D camera unit capturing images of entire shapes of the other surfaces of the tablets from the bottom.

10. The device of claim 4, further comprising the controller; and a tablet discharging unit including a defective product-discharging port and a good product-discharging port, classifying and discharging the tablets, wherein the controller controls the tablet printing unit to perform printing at certain positions of the tablets, depending on the images obtained from the pre-printing image-capturing unit, and discriminates whether the tablets are defective in at least one time, depending on the images obtained by the post-printing image-capturing unit, to determine a discharging port through which the tablets are classified and discharged.

11. The device of claim 10, wherein the controller inspects an exterior boundary line of each of the tablets and a surface of each of the tablets, captured by the post-printing image-capturing unit, to discriminate whether the printed surface of each of the tablets is good.

12. The device of claim 1, further comprising:

a base frame; and the tablet supplier disposed on the base frame and configured to arrange tablets supplied through a hopper in a line by centrifugal force, wherein the pre-printing image-capturing unit is disposed on one side of the tablet supplier, and captures images of exteriors of tablets, before printing, that are discharged and transferred from the tablet supplier, and
wherein the tablet printing unit irradiates laser light onto the transferred tablets.

13. The device of claim 1, wherein the controller acquires images of exteriors of the tablets being transferred obtained through the pre-printing image-capturing unit, to determine whether surfaces of the tablets, before printing, are defective.

14. The device of claim 1, wherein the controller learns the correction value according to the acquired tablet information, and controls the tablet printing unit to minimize a change in positions of the tablets to be printed, according to a change in rotations and shifts of the tablets.

15. A method for printing a tablet and inspecting an exterior of the tablet, comprising:
a transfer operation of disposing and transferring tablets supplied from a tablet supplier by a transfer unit;
a pre-printing image-capturing operation of capturing images of exteriors of the tablets being transferred by a pre-printing image-capturing unit, to discriminate positions and orientations of the tablets;
a printing operation of printing the tablets being transferred by a tablet printing unit, in consideration of discriminated results acquired from the images captured by the pre-printing image-capturing unit; and
an inspection operation of capturing images of exteriors of the printed tablets being transferred by a post-printing image-capturing unit, to inspect the images or printed results of the printed tablets;
wherein the pre-printing image-capturing operation further comprises acquiring images of exteriors of the tablets being transferred, to recognize positions of the tablets, and transfers tablet information including at least one of information on orientations, shift changes, and rotations of the tablets obtained from the acquiring the images, to a controller,
calculating a correction value including a position change value and a rotation value of the tablet printing unit in real time, depending on tablet information obtained from the acquiring the images by the controller, to control a laser irradiation position or a laser irradiation amount of the tablet printing unit, based on the correction value, and
wherein the inspection operation of capturing images comprises capturing images of at least one of a lateral surface and lateral edge of the tablet being transferred and an upper or lower surface of the tablet,
wherein the tablet printing unit is configured to see a UV laser, and
wherein the controller compares whether a character boundary line of a printed portion on the one surfaces of the tablets, captured by the post-printing image-capturing unit, and a character boundary line to be intended for printing are the same, and inspects whether a position of the character boundary line of the printed portion on the one surfaces of the tablets is in a central portion of each of the tablets, to discriminate whether the printed surface of each of the tablets is good.

16. The method of claim 15, wherein the pre-printing image-capturing operation further comprises capturing images of surface conditions of the tablets, before printing, to determine whether surfaces of the tablets are defective.

17. The method of claim 15, wherein the pre-printing image-capturing operation further comprises capturing images of first surfaces of the tablets, and reversing orientations of the tablets being transferred to capture images of second surfaces of the tablets, opposing the first surfaces.

18. The method of claim 17, wherein the printing operation further comprises printing the first surfaces of the tablets, or reversing the orientations of the tablets being transferred to print the second surfaces of the tablets, opposing the first surfaces.

19. The method of claim 17, wherein the inspection operation further comprises capturing images of entire exteriors of the tablets, based on the first surfaces of the tablets, and reversing the orientations of the tablets being transferred to capture images of entire exteriors of the tablets, based on the second surfaces of the tablets, opposing the first surfaces.

20. The method of claim 15, further comprising:
performing the transfer operation, the pre-printing image-capturing operation, the printing operation, and the inspection operation on first surfaces of the tablets, and reversing orientations of the tablets being transferred, to perform the transfer operation, the pre-printing image-capturing operation, the printing operation, and the inspection operation on second surfaces of the tablets, opposing the first surfaces.

21. The method of claim 15, wherein the printing operation further comprises controlling the tablet printing unit to perform printing at certain positions of the tablets, depending on tablet information obtained from the acquiring the images by the pre-printing image-capturing unit, to irradiate laser light.

22. The method of claim 15, wherein the inspection operation further comprises capturing an image of a front surface and front and rear lateral edge portions of at least one of one surfaces and the other surfaces of the tablets being transferred, and capturing an image of an entire shape of at least one of one surfaces and the other surfaces of the tablets being transferred.

23. The method of claim 15, further comprising an operation of discriminating whether the tablets are defective in at least one time, depending on the images obtained by the post-printing image-capturing unit, to classify and discharge the tablets, depending on the discriminated results.

* * * * *

UNITED STATES PATENT AND TRADEMARK OFFICE
CERTIFICATE OF CORRECTION

| | | |
|---|---|---|
| PATENT NO. | : 11,685,170 B2 | Page 1 of 1 |
| APPLICATION NO. | : 17/087864 | |
| DATED | : June 27, 2023 | |
| INVENTOR(S) | : Kyung Ho Lee and Byung In Kim | |

It is certified that error appears in the above-identified patent and that said Letters Patent is hereby corrected as shown below:

In the Claims

In Claim 1, Line 37 (which appears in Column 19, Line 19): the word "see" should be revised to --use--

Signed and Sealed this
Twenty-fourth Day of October, 2023

Katherine Kelly Vidal
*Director of the United States Patent and Trademark Office*